Patented May 20, 1947

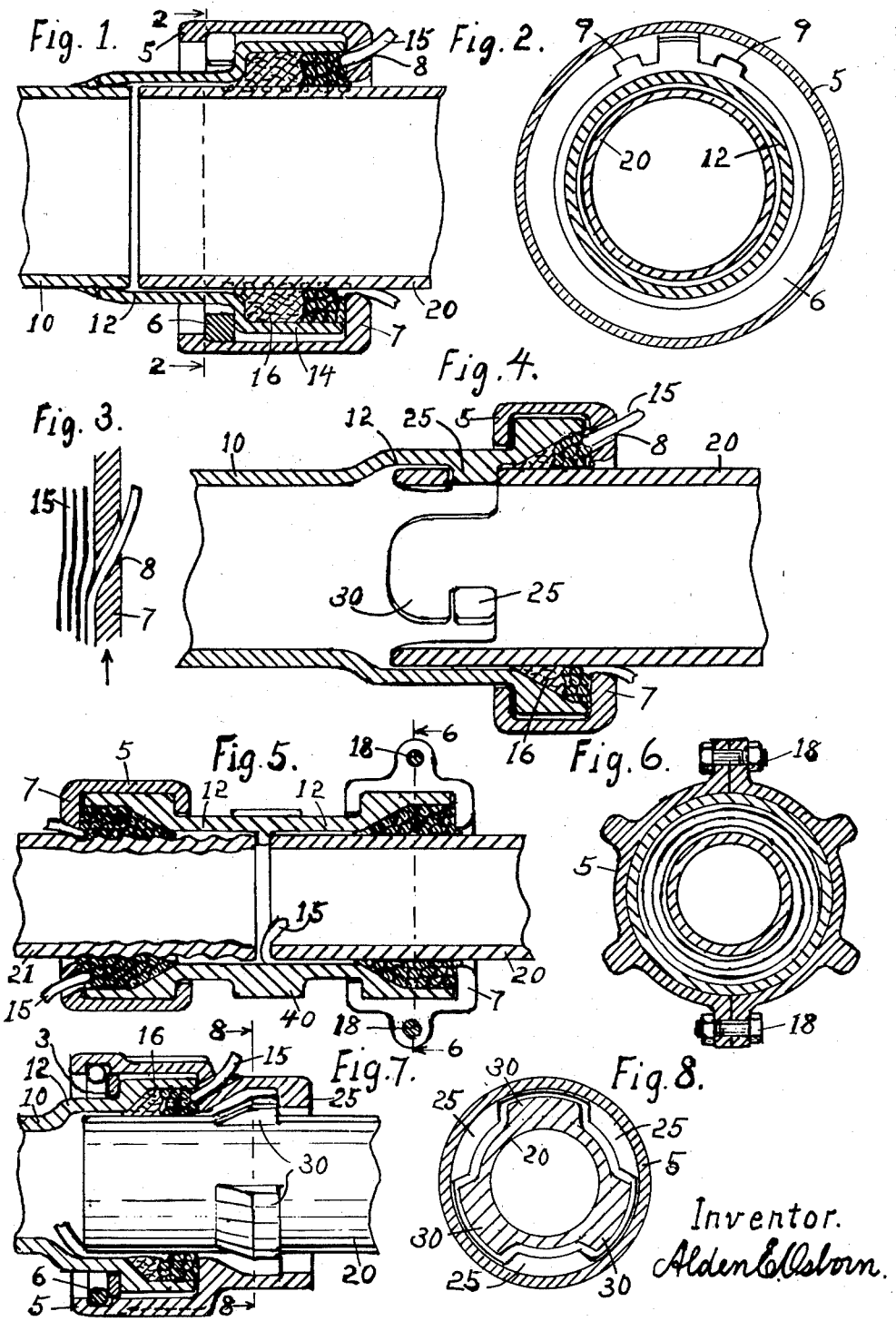

2,420,838

UNITED STATES PATENT OFFICE 2,420,838

PIPE JOINT

Alden E. Osborn, Mount Vernon, N. Y.

Application December 7, 1944, Serial No. 566,989

13 Claims. (Cl. 285—161)

1

This invention relates to an improved form of joint, for connecting pipes or tubes and for connecting pipes or tubes to fittings, which is simple, cheap to manufacture and easy to operate. While this joint can be used for all kinds of pipes or tubes, certain forms are particularly suitable for connecting cast iron, clay or other molded pipes, as such pipes and fittings can be made in the preferred shape without machine work or additional expense.

In the accompanying drawing:

Fig. 1 represents a longitudinal sectional view of one form of my pipe joint,

Fig. 2 represents a cross-sectional view taken on the line 2—2,

Fig. 3 represents a longitudinal sectional enlarged view of a part of Fig. 1,

Fig. 4 represents a longitudinal sectional view of a modification of Fig. 1,

Fig. 5 represents a longitudinal sectional view of a further modification of Fig. 1, applied to a coupling for connecting plain or grooved pipe ends, Fig. 6 represents a cross-sectional view of Fig. 5 taken on the line 6—6, Fig. 7 represents a longitudinal sectional view of a still further modification, and Fig. 8 represents a cross-sectional view of Fig. 7 taken on the line 8—8.

In Fig. 1 the end of two pipes or tubes are shown with these ends connected by the joint embodying a form of my invention. It should be understood that the ends of the pipes not shown in the drawing may be provided, if desired, with my pipe-joining means whereby these ends may also be connected to adjacent pipes or fittings.

In this figure 10 represents the end of one of the pipes or tubes to be connected and 20 the end of the other pipe or tube. The pipe 10 is provided with an enlarged end 12 in which the pipe 20 fits and with a further enlargement 14 which forms a circumferential channel space adapted to contain a suitable packing means 16. This enlarged end 14 is surrounded by a collar 5 which fits loosely over this enlarged end and is held in position by a split ring 6 that rests against a shoulder in the collar and against the back of the enlarged end 14 of the pipe. The collar 5 has an internal flange 7 which is provided with a hole 8 that preferably extends outward from and at an angle to the axis of the collar, as is particularly shown in Fig. 3. The split lock ring 6 can be arranged to fasten the parts together permanently or it can be provided with notches or holes 9, as shown in Fig. 2, which can be engaged by a contracting tool

2 so that the ring can be reduced in size and withdrawn from the collar 5, thus permitting the removal of the collar from the pipe 10. When connecting pipes with this form of joint the pipe 20 is inserted in the enlarged part 12 of the pipe 10 and a packing cord or flexible element 15 is passed thru the hole 8 and is held from movement in relation to the pipes while the collar 5 is turned in the direction indicated by the arrow in Fig. 3, which results in winding the element into the channel between two pipes and against the packing 16 where it builds up a considerable pressure and results in a very tight joint between the pipes. In many cases, as is shown by full lines in Fig. 1, no means need be required to prevent movement between two pipes, as the friction of the tightened packing and flexible element would be sufficient. However, where extra holding power is required, the packing and element can be made to give greater hold on the pipe 20 by grooving or roughing same, as is shown by the dotted lines.

In the form of my invention illustrated in Fig. 4 a modified means for preventing the separation of the pipes, as well as certain other changes, are shown. This consists of providing the enlarged end 12 of the pipe 10 with (preferably three) internal projections or bosses 25 which engage lugs or grooves 30 in the inner pipe 20 when that pipe has been inserted into the socket 12 of the pipe 10 and rotated. In this figure the collar 5 is rotatably fastened on the enlarged end 14 of the pipe 10 by having the pipe cast when the collar is in position in the mold. The collar 5 is placed in the mold after being coated with a heat-resisting coating that holds the pipe metal from contact with it, and after cooling, the collar is loosened by removing the coating from between the parts. The collar 5 is rotated to draw the packing or flexible element 15 into the packing channel or space in the same manner as was described in connection with the form of my invention shown in Fig. 1. In this figure the packing channel is also shown as provided with a fixed packing ring 16 against which the flexible element is wound. In this case, as in the other forms having a pre-inserted packing 16, the packing cord 15 can act mainly as a means to develop pressure on this packing 16 to force it against the pipes and prevent leakage. The cord or element 15 wound into the channel can be stronger than that which can be used if its function is mainly to prevent leakage and thus a very high pressure is obtainable and, moreover, as the separate packing 16 fills a large part of the channel, the joint can be made tight with relatively few turns of the collar 5.

In Fig. 5 is shown my invention applied to a coupling adapted to connect the plain ends of pipes or tubes. In this case the coupling or fitting 40 contains the sockets 12 into which the end of the pipes or tubes 20—21 are inserted, these sockets being provided at their outer ends with a circumferential channel for the packing, as in the other figures. The collars 5 are rotatably mounted on the enlarged ends of the fitting and, in this form, are split into two sections which are fastened together by bolts 18 as is shown in Fig. 6. It will be noticed that, at one end of Fig. 5, the pipe 20 is shown with a smooth surface, while at the other end the pipe 21 is shown as corrugated to prevent slippage, the use of plain, grooved or shouldered pipe ends or pipes locked from separation by substantially the means shown in Fig. 4, being optional.

The modification shown in Fig. 7 employs a split lock ring 6 and a washer 3 to hold a collar 5 on the enlarged end of the pipe. In this form a modified means is provided to prevent separation of the pipes 10 and 20 which comprises providing the collar 5 with internal lugs or projections 25 which co-operate with lugs or projections 30 on the exterior of the pipe 20 so that, after the packing cord or element 15 has been wound into the channel the collar would be turned to a position to bring its internal lugs 25 into the line with the external lugs 30 on the pipe 20 and prevent the separation of the parts. In Fig. 8 an end view of these lugs is shown with the lugs in the position they assume when the pipe is being introduced into the pipe 10 and before the collar 5 is turned to its locking position.

It will be noted that in tightening my pipe joint the packing is forced into a channel between two relatively stationary parts and that the only friction restraining the collar from turning is that of the packing against the flange 7 of the collar 5 and thrust of the collar-retaining means against the back of the enlarged pipe end. As this friction is relatively small, a very high pressure can be obtained on the packing with a comparatively little effort being required to turn the collar.

It is obvious that these pipe joints can be applied to many other forms of fittings to which it is desired to connect pipes or tubes besides the coupling illustrated in the drawing and it should be understood that various modifications can be made within the scope of the appended claims.

I claim:

1. A pipe joining means comprising a socket member having an enlarged end adapted to form a circumferential space around the outside of a pipe to be connected to said member, a collar rotatably mounted on said member and having an internal flange adapted to form an end wall of said space, said flange having an opening therethru intersecting said space, means to hold said collar from longitudinal displacement in relation to said member, and a flexible element adapted to be inserted into said space thru said opening by the rotation of said collar in relation to said member and said pipe.

2. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having a slanting opening therethru at an angle to the axis of said pipe and said member and intersecting said space, means to hold said collar from longitudinal displacement in relation to said member, and a flexible element adapted to be inserted into said space thru said opening by the rotation of said collar in relation to said member and said pipe in the direction of the slant of said opening whereby the angle thru which said flexible element is bent when entering said space is reduced.

3. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having an opening therethru intersecting said space, means to hold said collar from longitudinal displacement in relation to said member, and a flexible element adapted to be inserted into said space thru said opening by having an end thereof inserted thru said opening and anchored in relation to said pipe while said collar is rotated to draw more of said element thru said opening into said space to compress said element against the walls thereof.

4. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having an opening therethru intersecting said space, a second internal flange on said collar, a split ring engaging said last-mentioned flange on said collar and said enlarged end of said member, and a flexible element adapted to be inserted into said space thru said opening by the rotation of said collar in relation to said member and said pipe.

5. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having an opening therethru intersecting said space, means to hold said collar from longitudinal displacement in relation to said member, a packing means in said space, and a means for exerting pressure on said packing means comprising a flexible element adapted to be inserted into said space at one side of said packing means thru said opening by the rotation of said collar in relation to said member and said pipe.

6. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having an opening therethru intersecting said space, means to hold said collar from longitudinal displacement in relation to said member, a flexible element adapted to be inserted into said space thru said opening by the rotation of said collar in relation to said member and said pipe, and means acting independently of said flexible element for holding said member and said pipe from relative longitudinal displacement.

7. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having an opening therethru intersecting said space, means to hold said collar from longitudinal displacement in relation to said member, a flexible element adapted to be inserted into said space thru said opening by the rotation of said collar in relation to said member and said pipe, and means comprising internal lugs on said collar and co-operating external lugs on said pipe to prevent longitudinal displacement between said member and said pipe.

8. A pipe joining means comprising a socket member having an enlarged end adapted to form a circumferential space around the outside of a pipe to be connected to said member, a collar having an internal flange adapted to form an end wall of said space and rotatable in relation to said member and said pipe, said flange having an opening therethru intersecting said space, means for retaining said collar on said member comprising a second internal flange on said collar, a split ring engaging said last-mentioned flange on said collar and between said flange and said enlarged end of said member, and means for preventing leakage between said member and said pipe comprising a flexible element adapted to be inserted into said space thru said opening by the rotation of said collar in relation to said member and said pipe.

9. A pipe joining means comprising a socket member having an enlarged end adapted to form a circumferential space around the outside of the pipe to be connected to said member, said space being open at one end, a second member rotatable in relation to said socket member and said pipe and being adapted to form an end wall to close said open end of said circumferential space with said second-mentioned member having an opening therethru intersecting said circumferential space, and a flexible element adapted to be inserted into said space thru said opening by the rotation of said second-mentioned member in relation to said socket member and said pipe.

10. A pipe joining means comprising a socket member having an enlarged end adapted to form a circumferential space around the outside of the pipe to be connected to said member, said space being open at one end, a second member rotatable in relation to said socket member and said pipe and being adapted to form an end wall to close said open end of said circumferential space with said second-mentioned member having an opening therethru intersecting said circumferential space, and a flexible element adapted to be inserted into said space thru said opening by having an end thereof inserted thru said opening and anchored in relation to said pipe while said second-mentioned member is rotated to draw an additional amount of said element thru said opening into said space to compress said element against the walls thereof.

11. A pipe joining means comprising a socket member having an enlarged end adapted to form a circumferential space around the outside of a pipe to be connected to said member, said space being open at one end, a second member rotatable in relation to said socket member and pipe and adapted to form an end wall to close said open end of said circumferential space with said second-mentioned member having an opening therethru intersecting said circumferential space, a packing means in said circumferential space, and a flexible element adapted to be inserted into said circumferential space adjacent to said packing means by having an end thereof inserted thru said opening of said second-mentioned member and anchored in relation to said pipe, while said member is rotated to draw an additional amount of said element thru said opening into said space and against said packing means to compress said packing means against the walls of said circumferential space.

12. A pipe joining means comprising a socket member having an enlarged end adapted to form a circumferential space around the outside of a pipe to be connected to said member, said space being open at one end, a second member rotatable in relation to said socket member and pipe and adapted to form an end wall to close said open end of said circumferential space with said second-mentioned member having an opening therethru intersecting said circumferential space, a packing means in said circumferential space, a flexible element adapted to be inserted into said circumferential space adjacent to said packing means by having an end thereof inserted thru said opening of said second-mentioned member and anchored in relation to said pipe, while said member is rotated to draw an additional amount of said element thru said opening into said space and against said packing means to compress said packing means against the walls of said circumferential space, and means comprising internal lugs on said second-mentioned member and co-operating external lugs on said pipe to prevent longitudinal displacement between said socket member and said pipe when said second-mentioned member is rotated to cause the alignment of said second-mentioned member lugs and said pipe lugs.

13. A joint means for preventing leakage between two relatively stationary parts having surfaces spaced apart to form a part of the walls of a circumferential space, comprising a rotatable element having a surface forming another part of the wall of said circumferential space and having a passage therethru intersecting said space, and a flexible element adapted to be wound into said circumferential space thru said passage when an end of said flexible element extending thru said passage and said circumferential space is held from movement in relation to said relatively stationary members and said rotatable element is turned.

ALDEN E. OSBORN.

REFERENCES CITED

The following references are of record in the file of this patent:

UNITED STATES PATENTS

| Number | Name | Date |
| --- | --- | --- |
| 2,104,351 | Osborn | Jan. 4, 1938 |